(No Model.)
J. B. WARING.
SUPPORT FOR ROCK DRILLING MACHINES.
No. 312,412. Patented Feb. 17, 1885.
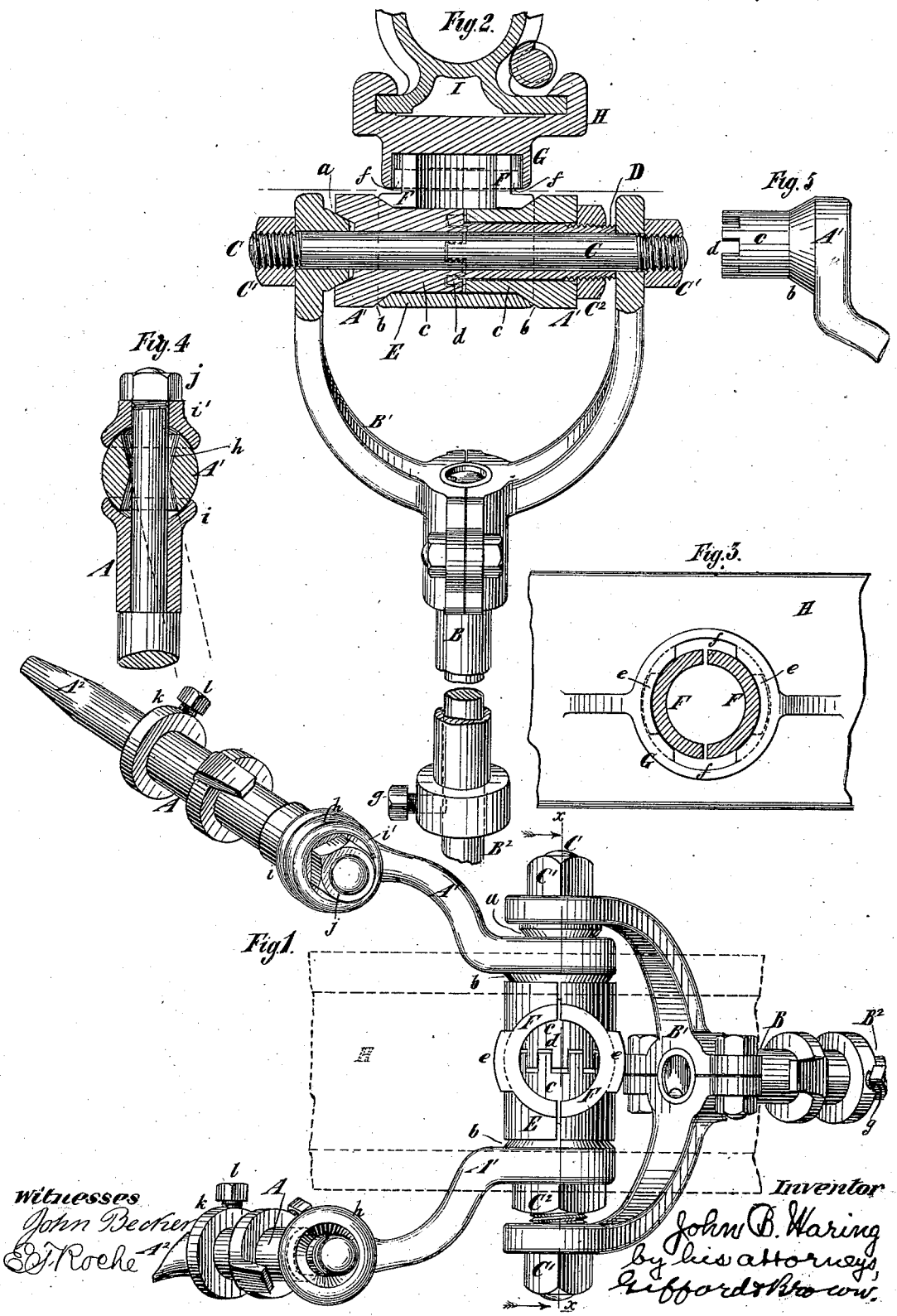

UNITED STATES PATENT OFFICE.

JOHN B. WARING, OF NEW YORK, N. Y., ASSIGNOR TO THE INGERSOLL ROCK DRILL COMPANY, OF SAME PLACE.

SUPPORT FOR ROCK-DRILLING MACHINES.

SPECIFICATION forming part of Letters Patent No. 312,412, dated February 17, 1885.

Application filed August 21, 1884. (No model.)

*To all whom it may concern:*

Be it known that I, JOHN B. WARING, of New York, in the county of New York and State of New York, have invented certain new and useful Improvements in Supports for Rock-Drilling Machines, of which the following is a specification.

I will describe a rock-drill support embodying my improvement, and then point out its features in the claims.

In the accompanying drawings, Figure 1 is a plan or top view of a tripod or support embodying my improvements. Fig. 2 is a transverse section of the same, taken at the plane of the line $x$ $x$, Fig. 1, and looking in the direction of the arrow. Fig. 3 is a sectional view thereof, taken immediately under the table and looking upward. Fig. 4 is a longitudinal section of a portion of one of the legs, and Fig. 5 is a side view of the upper portion of one of the legs.

Similar letters of reference designate corresponding parts in all the figures.

A A' B B' designate legs, here shown as three in number, rendering appropriate the term "tripod" in describing the support as a whole. The upper sections, A', of the two legs A A' and the upper section, B', of the other leg, B B', are connected together so as that they may be adjusted toward or away from each other like leaves of a hinge. The upper section, B', of the leg B B' is bow-shaped, or provided with two arms. At the inner side of one of its arms it is provided with a conical clamping piece or lug, $a$, which fits in a bearing of similar form in the outer side of the upper section, A', of one of the legs A A'. The upper sections, A', of the legs A A' have on their inner sides conical lugs or spreaders $b$, and extending therefrom cylindric shanks $c$, which at their meeting edges are toothed, as at $d$, so as to engage with each other and preclude the oscillation of either without the other. A bolt, C, passing through the ends of the section B' of the leg B B' and through the ends of the sections A' of the legs A A', as well as through their shanks $c$, connects the several legs together. I have shown a sleeve-like extension, D, extending from one of the shanks $c$, and extending between this bolt C and the other shank $c$ and end of the section A', and forming a bearing for them. Nuts C' applied to the ends of the bolt C secure the latter in position. Nuts C' applied to the ends of the bolt C serve to secure the leg B B' to one of the legs A A'. This result is effected in the following manner: By tightening either or both of the nuts C' one of the arms of the upper section, B', of the leg B B' is caused to bear against the end of the sleeve-like extension D, and the clamping-piece $a$ on the other arm is caused to exert such friction within the bearing in the section A' of one of the legs A A' that the said leg B B' will be secure from movement relatively to that leg A A'. By loosening one of said nuts said legs B B' and A A' can be adjusted relatively to each other.

In order to secure together the two legs A A', I have shown a nut, $C^2$, applied to the outwardly-extending portion of the sleeve-like extension D, and bearing against the section A' of one of the legs A A', surrounding said extension. By tightening the said nut $C^2$ said two legs A A' are firmly secured together by means of their toothed engagement, and neither is capable of movement relatively to the other.

If desirable, the clamping-piece may be affixed to one of the legs A A' and fitting in a bearing in the leg B B'. It will be seen, therefore, that when the parts are in the position last described, by loosening one of the nuts C', the leg B B' may be adjusted to any desired position relatively to both of the legs A A'. It is also clear that by loosening one of said nuts C' and the nut $C^2$, and shifting the legs and then tightening the said nuts, all the legs may be adjusted and secured in different positions relatively to each other.

On the shanks $c$ and spreaders $b$ of the legs A A' fits a split cylindric sleeve, E, whose upper meeting edges are in a vertical plane, so that when actuated by the spreaders $b$ they may be adjusted sidewise farther away from one another. The spreaders $b$ act on them by being wedged between their ends through the action of the nut $C^2$ on the sleeve C.

F designates semi-cylindric shanks extending one from each of the meeting edges of the sleeve E in proximity to each other, and having at opposite points outwardly-extending lugs $e$. These shanks F fit into a socket, G, extending from the table H, by which the drill-engine I is supported. This socket has recesses $f$ in its inner wall for passing over the lugs $e$, and after the socket has been slipped over the shanks F it is turned around so as to bring its recesses $f$ out of line with the lugs $e$, and preclude the detachment of the table from the said shanks F. The spreaders $b$, in expanding the sleeve E, also expand the shanks F, thereby causing them to bind or clamp tightly in the socket G, and retain the table H in place.

It is obvious that if in lieu of the spreaders $b$ there were employed internally-conical faces lapping over the sleeves E, and serving to contract the same around a stem extending from the table H in lieu of the socket G, the same results might be produced, the lugs $e$ in this case being arranged on the said stem of the recesses $f$ in the shanks F.

The nut $C^2$ performs the double purpose of securing the legs A A' together in position relatively to each other, and of fastening the table in place. Thus I provide, also, for turning the table around into different positions, and securing it there. The engine of the drill may be fitted to the table and fed along in the ordinary or any other suitable manner.

The bow-shaped upper section of the leg B B' is provided with a socket wherein fits the upper end of the section B, the latter being clamped in place by means of bolts and nuts applied to the open side or sides of the socket to provide for adjusting it when necessary. This section B is shown as hollow and as provided at the lower end with a collar fitted with a set-screw, $g$. Within it fits an extensible foot, $B^2$, which may be moved in or out of the section B, and secured in place by the set-screw $g$, so as to elevate the table into any desired position.

At the outer ends of the sections A' of the legs A A' are sockets $h$, having in them reversed conical recesses, with the smallest diameter located at the middle and convex exteriors. The upper ends of the sections A fit in these sockets, and are provided with concave flanges $i\ i'$, fitting one above and another below the convex exterior of the sockets. The flange $i$ is rigidly affixed in place, but the upper flange, $i'$, is loose on the section A, and is held in place by a nut, $j$, screwed on the end of the section A. The section A of each leg A A' may thus be adjusted at different angles, as indicated by Fig. 4, and clamped securely in position. The lower part of the section A of the legs A A' is hollow, and at the end has a collar, $k$, provided with a set-screw, $l$.

In each section A fits an extensible foot, $A^2$, which may be moved inward or outward to elevate more or less the legs A A', and may be secured in position by the set-screw $l$.

It will be seen that by my invention I provide a tripod which may be elevated at any desirable point or points to adjust a drill-engine into the required position, and which may have its legs adjusted relatively to each other, so as to brace and stay the engine effectively. Weights may be applied to the legs of this tripod in the ordinary manner for precluding the tripod from tilting or canting over.

I am aware of patent to Waring, No. 169,389, and dated November 2, 1875, and I do not herein claim anything claimed therein.

What I claim as my invention, and desire to secure by Letters Patent, is—

1. The combination, in a support for a drilling-machine, of a pair of legs having at their upper ends shanks provided at their meeting edges with interlocking teeth, a screw-threaded part, made integral with one of said shanks, and a nut engaging with the screw-threaded part for holding said teeth in engagement with each other, substantially as specified.

2. The combination, with a drilling-machine support, of a leg composed of the section A', adapted to be swung upward and downward relatively to the table of the drill, and provided with the socket $h$, having a convexed exterior, the section A, adjustable angularly relatively to the section A', and having a portion extending through the socket $h$, the flange $i$, made integral with the leg-section A, and fitting upon the convexed surface of the socket $h$, the loose flange $i$, also fitting about the convexed surface of the socket $h$, and the nut $j$, for securing the leg-sections A A' and the flange $i$ together.

3. The combination, in a support for a drilling-machine, of a table provided with a stem, legs for supporting the table, a split sleeve fitting the legs, shanks on said sleeve fitting the stem of the table, shanks on said legs extending into the sleeve-surfaces on said shanks, serving to cause the shanks of the split sleeve to fit the stem of the table tightly, a screw-threaded part, made integral with one of the shanks on said legs, and a nut applied thereto for drawing the legs together, substantially as specified.

4. The combination, in a support for a drilling-machine, of a table provided with a stem, legs for supporting the table, a split sleeve fitting the legs, shanks on said sleeve fitting the stem of the table, interlocking lugs or recesses on said shanks or said stem, shanks on said legs extending into the sleeve, surfaces on said shanks serving to cause the shanks of the split sleeve to fit the stem of the table tightly, a screw-threaded part made integral with one of the shanks on said legs, and a nut applied thereto for drawing the legs together, substantially as specified.

5. The combination of the drill-table H, leg-sections A', serving to support the same, shanks on said leg-sections, spreaders $b$ on said shanks, a split sleeve, E, fitting the shanks on said leg-sections between the spreaders, shanks F on said sleeve, provided with lugs $e$, the stem G on the table H, provided with the recesses $f$, a screw-threaded part, D, made integral with one of the shanks on said leg-sections A', and a nut, $C^2$, engaging with said screw-threaded part for drawing said sections together, substantially as specified.

6. The combination of the drill-table H, leg-sections A', serving to support the same, spreaders b on said leg-sections, the split sleeve E, fitting said leg-sections between the spreaders, shanks F on said sleeve, provided with lugs e, the stem G, extending from the table H, and provided with recesses f, a screw-threaded part, D, on one of the leg-sections A', a nut, C², for drawing said leg-sections together, the leg-section B', having the clamping-piece a, a bearing for said clamping-piece in one of the leg-sections A', the bolt C, and the nuts C', substantially as described, whereby the table may be secured in position, and the leg-sections A' and B' may also be secured in position.

J. B. WARING.

Witnesses:
FREDK. HAYNES,
T. J. KEANE.